United States Patent
Ning et al.

(10) Patent No.: US 10,402,362 B2
(45) Date of Patent: Sep. 3, 2019

(54) MANAGEMENT AND DISPATCHING APPARATUS, SYSTEM, AND METHOD BASED ON SAS

(71) Applicant: HUAWEI TECHNOLOGIES CO., LTD., Shenzhen, Guangdong (CN)

(72) Inventors: Zuolin Ning, Shenzhen (CN); Rongguo Liu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 15/393,681

(22) Filed: Dec. 29, 2016

(65) Prior Publication Data

US 2017/0192932 A1    Jul. 6, 2017

(30) Foreign Application Priority Data

Dec. 31, 2015    (CN) .......................... 2015 1 1032014

(51) Int. Cl.
*G06F 13/36* (2006.01)
*G06F 13/42* (2006.01)
(Continued)

(52) U.S. Cl.
CPC ........ *G06F 13/4282* (2013.01); *G06F 3/0601* (2013.01); *G06F 13/28* (2013.01); *G06F 2213/0028* (2013.01)

(58) Field of Classification Search
CPC ................ G06F 13/28; G06F 13/4282; G06F 2213/0028; G06F 3/0601
See application file for complete search history.

(56) References Cited

U.S. PATENT DOCUMENTS 7,506,080 B2    3/2009  Lau et al.
2006/0080671 A1  4/2006  Day et al.
(Continued)

FOREIGN PATENT DOCUMENTS

CN    101263464 A    9/2008
CN    102073605 A    5/2011

OTHER PUBLICATIONS

Extended European Search Report, dated May 31, 2017, in European Application No. 16207259.9 (7 pp.).
(Continued)

*Primary Examiner* — Idriss N Alrobaye
*Assistant Examiner* — Richard B Franklin
(74) *Attorney, Agent, or Firm* — Staas & Halsey LLP

(57) ABSTRACT

This application relates to the field of communications technologies, and in particular, to a management and dispatching apparatus, system and method based on a SAS. The apparatus communicates with a device in a SAS domain based on an upper-layer protocol request. A list management module manages, in a manner of a list, pending input and output information and device information that are obtained based on the upper-layer protocol request. After there is an idle SAS channel, the apparatus obtains the pending input and output information and the device information in the list by indexing the list. A DMAC on the SAS channel performs frame interaction with a corresponding device in the SAS domain based on the pending input and output information and the device information. In this application, a pending task is managed by using a list, and centralized dispatching is implemented, thereby reducing internal resource overheads.

26 Claims, 5 Drawing Sheets

(51) Int. Cl.
   *G06F 13/28*      (2006.01)
   *G06F 3/06*       (2006.01)

(56) References Cited

U.S. PATENT DOCUMENTS

2007/0067504 A1   3/2007   Lau et al.
2012/0311236 A1   12/2012  Ohshima

OTHER PUBLICATIONS

Working DraftProject American NationalT10/BSR INCITS 492 Standard, Revision 06b, Dec. 4, 2013 Information technology—SAS Protocol Layer-3 (SPL-3), pp. 1-835.

MANAGEMENT AND DISPATCHING APPARATUS, SYSTEM, AND METHOD BASED ON SAS

CROSS-REFERENCE TO RELATED APPLICATION

This application claims priority to Chinese Patent Application No. 201511032014.2, filed on Dec. 31, 2015, which is hereby incorporated by reference in its entirety.

TECHNICAL FIELD

The present invention relates to the field of communications technologies, and in particular, to a SAS (Serial Attached SCSI, serial attached small computer system interface) technology.

BACKGROUND

As SASs (Serial Attached SCSI, serial attached small computer system interface) are widely applied to servers and arrays, more devices perform networking by using a SAS domain (SAS domain).

In a SAS host/target (SAS host/target) application, a host/target (host/target) needs to perform interconnect communication with a remote target/host (target/host) by using a SAS Expander (SAS expander). That is, neither communication between a host (host) and a target (target) nor communication between a target and a host is a simple point-to-point direct connection mode any more, and extension needs to be performed by using an expander (expander). Multiple ports (port) are included in a SAS controller. Some ports (port) are directly connected to a remote device, and some ports (port) are interconnected with the remote device by using an expander (expander).

For example, a self-developed host-side SAS controller supports 2K devices (device) and concurrency of 4K IOs (input and output), and a target-side SAS controller supports 64 hosts and concurrency of 256 IOs. Therefore, how to efficiently manage multiple ports (port), multiple devices (device), and concurrency of multiple IOs of each device (device) in the SAS controller is a technical problem that needs to be resolved.

According to a SAS standard protocol layering, ports are independent of one another, and a PL_OC state machine of a port layer (port layer) manages a pending request. The mechanism has a serious problem: there is no strict mapping relationship between a quantity of devices and a quantity of concurrent IOs that are both supported by a SAS controller and a port. If devices and IOs at each port are separately managed, each port needs to manage the devices and the IOs according to a supported maximum specification. As a result, required resource overheads are directly proportional to a quantity of ports in the controller, causing large overheads, and making it difficult to manage.

In a prior-art solution, a to-be-sent task is managed at a software layer, and software dispatches and selects a sending request to instruct hardware (hardware) to perform frame processing. The solution has the following problems:

(1) Each IO has multiple times of interaction between the software and logic, including: the task is delivered to a configuration logic register, the logic completes report interruption, the software searches for a completion status, and the like, thereby causing a great processing delay.

(2) A task queue needs to be maintained in the software, and overheads of cache space of an access queue are large.

(3) Each Port independently manages resources, thereby causing large overheads.

SUMMARY

This specification describes a management and dispatching apparatus, system and method based on a SAS, so as to implement centralized management and dispatching of multiple ports, multiple devices, and multiple IOs.

According to one aspect, an embodiment of this application provides a management and dispatching apparatus based on a SAS. The apparatus communicates with a corresponding SAS domain based on an upper-layer protocol request. The apparatus includes a list management module, a dispatcher, and a DMAC (Direct Memory Access Controller, direct memory access controller) on a SAS channel. The list management module manages, in a manner of a list, pending IO information and device information that are obtained based on the upper-layer protocol request. After there is an idle SAS channel, the dispatcher obtains the pending IO information and the device information in the list by indexing the list. The DMAC in the SAS performs frame interaction with a corresponding device in the SAS domain based on the pending input and output information and the device information.

According to another aspect, an embodiment of this application provides a controller based on a SAS, where the controller includes the apparatus of the foregoing aspect.

According to another aspect, an embodiment of this application provides a management and dispatching system based on a SAS, where the system includes the apparatus and the corresponding SAS domain in the foregoing aspects, and the SAS domain includes multiple devices.

According to still another aspect, an embodiment of this application provides a management and dispatching method based on a SAS. A SAS controller communicates with a device in a corresponding SAS domain based on an upper-layer protocol request. The method includes: checking, by the SAS controller, a status of a corresponding SAS channel, and when the SAS channel is idle, obtaining pending input and output information and device information by indexing a list, where the pending input and output information and the device information are obtained by parsing the upper-layer protocol request and are managed in a manner of a list; and performing, by the SAS controller, frame interaction with the corresponding device in the SAS domain based on the pending input and output information and the device information.

According to embodiments of this application, management and dispatching of a list are implemented in a manner of hardware (for example, a SAS controller), and concurrency of multiple IOs is centrally managed by using the list. The embodiments of this application can efficiently manage and dispatch multiple ports, multiple devices, and concurrency of multiple IOs, thereby reducing internal resource overheads. In addition, according to the embodiments of this application, the SAS controller perceives a status of a SAS channel and checks whether there is a pending task in a list management module, thereby reducing a processing delay.

In a possible design, the pending IO information is a pending IO ID (identifier), and target device information is a target device ID (identifier).

In a possible design, the foregoing list further includes information about a port performing frame interaction with the device, and the information about the port is whether there is pending device information at the port. When the dispatcher detects that the information about the port is that there is pending device information at the port, the dispatcher obtains the device information at the port, and obtains pending IO information according to the obtained device information.

In a possible design, the pending IO information, the device information, and the information about the port are stored in the foregoing list in a form of a data structure.

An IO node data structure includes one or more of the following fields: a field used to indicate a previous IO identifier of a current IO, or a field used to indicate a next identifier of a current IO.

A device node data structure includes one or more the following fields: a field used to indicate whether there is a pending command IO on a current device, a field used to indicate an IO identifier corresponding to a pending command IO list tail node on a current device, a field used to indicate an IO identifier corresponding to a pending command IO list header node on a current device, a field used to indicate whether there is a pending data IO identifier on a current device, a field used to indicate an IO identifier corresponding to a pending data IO list tail node on a current device, a field used to indicate an IO identifier corresponding to a pending data IO list header node on a current device, a field used to indicate a device identifier of a previous node of a current node, or a field used to indicate a device identifier of a next node of a current node.

A port node data structure includes one or more of the following fields: a field used to indicate whether there is a pending device at a current port, a field used to indicate a list header node identifier of a pending device at a current port, or a field used to indicate a list tail node identifier of a pending device at a current port.

A port data structure, a device data structure, and an IO data structure are separated, and the port node data structure, the device list node data structure, and the IO list node data structure jointly form the list. Therefore, when an exception occurs, the SAS controller can conveniently cancel all pending IOs on a device, or cancel all pending IOs at a port. However, in the device list node data structure, a command and data are separated, that is, the command and the data are indicated in a form of different fields. Therefore, dispatching priority policies such as a command dispatching priority policy, a data dispatching priority policy, or an RR policy can be implemented.

In a possible design, the device in the SAS domain is a host or a disk sheet.

According to the present invention, a SAS controller perceives a status of a SAS channel, and sends, by using an idle SAS channel, a pending task by searching a list in the SAS controller, so that devices in a SAS domain work by turns as much as possible, and a phenomenon of high load and "starvation" is prevented from occurring.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The following describes the embodiments of the present invention with reference to the accompanying drawings.

Figure 1:
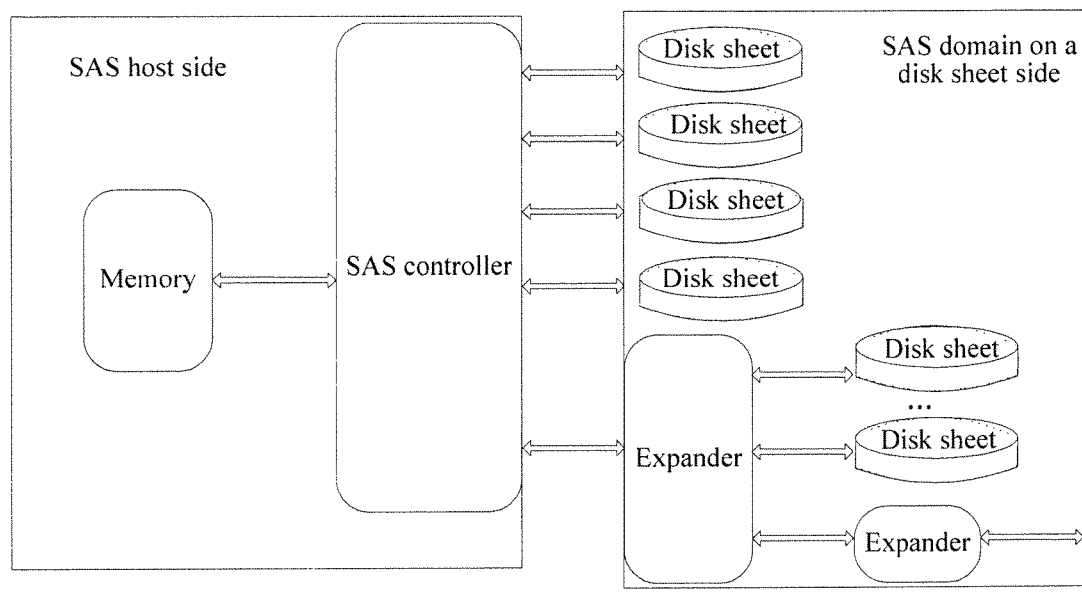
FIG. 1 is a schematic diagram showing that a host performs networking by using a SAS controller according to an embodiment of the present invention.

FIG. 1 is a schematic diagram showing that a SAS host performs networking by using a SAS controller. In FIG. 1, the SAS host (SAS host) performs networking by using a SAS controller in the host. In this case, multiple disk sheets and an expander (Expander) are included in a SAS domain (SAS domain). The expander is configured to connect the SAS controller and a disk sheet, and/or connect the SAS controller and another expander, and/or connect disk sheets, or the like, so that more disk sheets can be connected in the SAS domain. The disk sheet may be of any one or more disk sheet types such as a SAS HDD (mechanical hard disk)/SSD (solid-state disk) or a SATA (interface-type hard disk). Therefore, the SAS host performs networking by using the SAS controller, so that the SAS host can communicate with the disk sheet. In this case, multiple disk sheets are included in the SAS domain.

Figure 2:
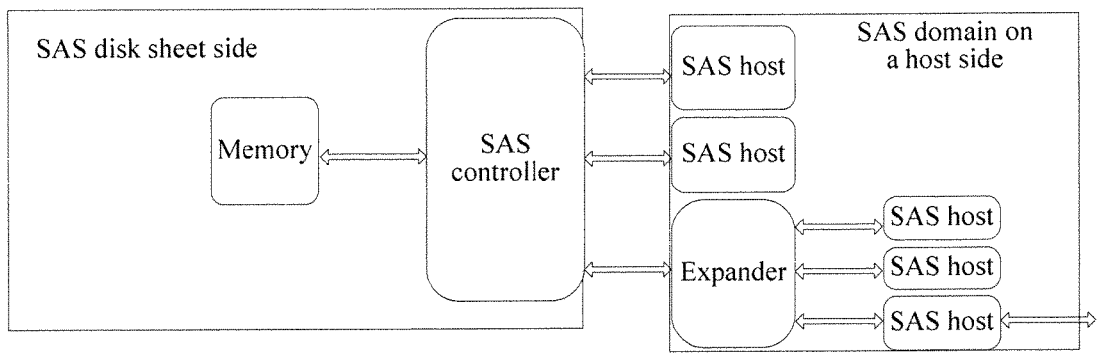
FIG. 2 is a schematic diagram showing that a disk sheet performs networking by using a SAS controller according to an embodiment of the present invention.

FIG. 2 is a schematic diagram showing that a disk sheet performs networking by using a SAS controller. In FIG. 2, a SAS disk sheet (for example, a SAS SSD) performs networking by using a SAS controller on a side of the disk sheet. In this case, multiple SAS hosts (SAS host) and an expander (Expander) are included in a SAS domain (SAS domain). The expander is configured to connect the SAS controller and a SAS host, and/or connect the SAS controller and another expander, and/or connect SAS hosts, or the like, so that more SAS hosts can be connected in the SAS domain. Therefore, the disk sheet performs networking by using the SAS controller, so that the disk sheet can communicate with the SAS host. In this case, multiple SAS hosts are included in the SAS domain.

Figure 3:
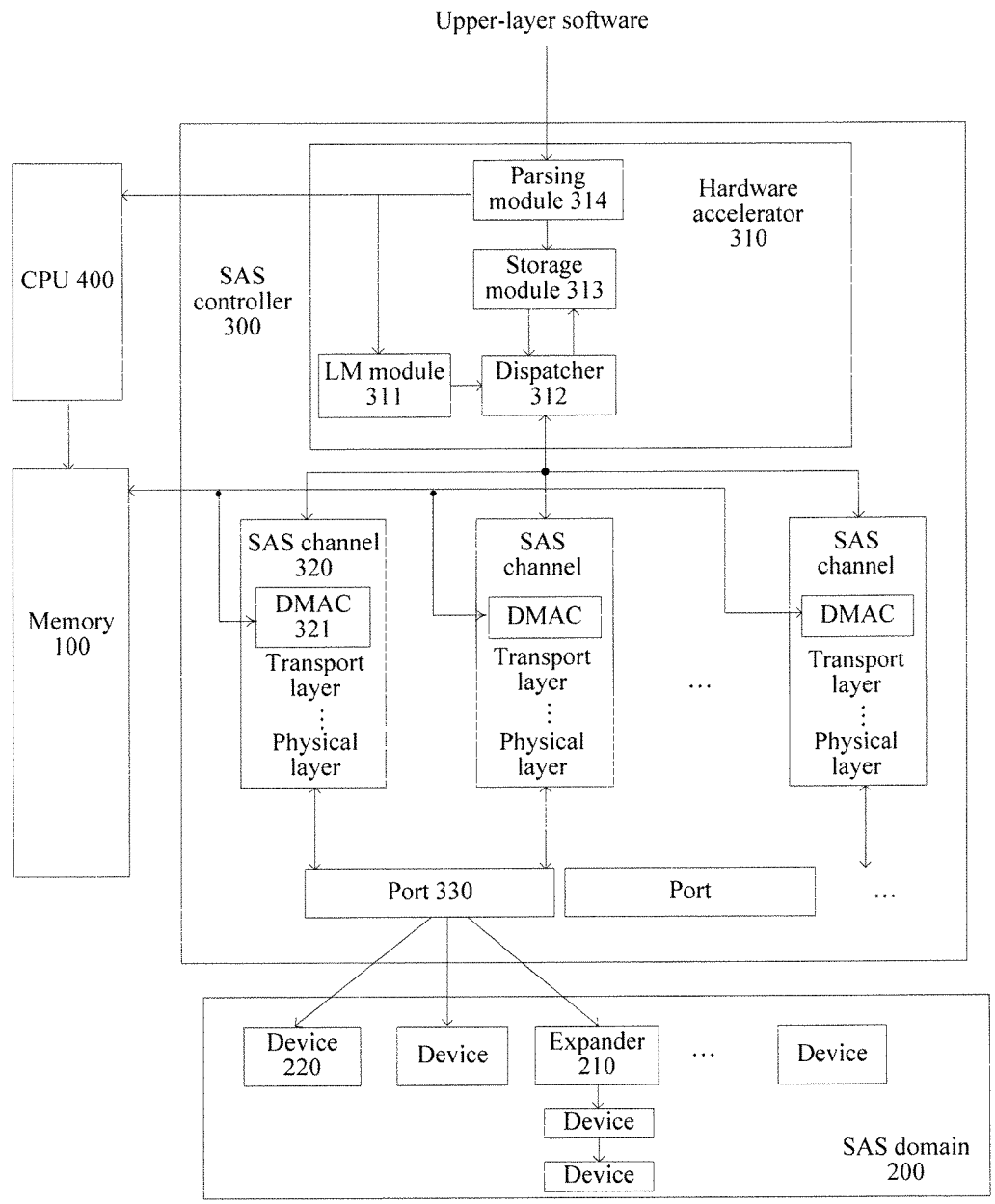
FIG. 3 is a schematic diagram of a management and dispatching system based on a SAS according to an embodiment of the present invention.

FIG. 3 is a schematic diagram of a management and dispatching system based on a SAS according to an embodiment of the present invention. The system implements management and dispatching of devices (device, DEV for short) at multiple ports (port) and concurrency of multiple IOs (input and output) of the devices by using a hardware SAS controller, and the management is implemented by using a list.

Before functions of apparatuses and modules in FIG. 3 are described in detail, IO (input and output, such as a SSP/SMP/STP command) concurrency is explained first. During a data processing process, an exchange of data from a device to another device is referred to as a data stream (stream), and a process of the exchange is an IO. Generally, IOs, such as a data IO of a hard disk, an IO of a CPU, and an IO of a memory, are performed in order. However, IOs between networks gradually tend to be processed concurrently, that is, IO concurrency. The IO concurrency refers to that multiple commands may be executed concurrently between two devices, that is, multiple IOs perform time division multiplexing on a SAS link to perform IO frame interaction. To efficiently manage concurrency of multiple IOs, according to the embodiments of the present invention, the concurrency of multiple IOs are centrally managed by using a list, and information, such as a pending (pending) IO ID (identifier), a device (which is a target device, and belong to the SAS domain) ID, and an ID of a port (port) performing frame interaction with the device, is centrally managed in a manner of a list. After finding that there is an idle SAS channel (SAS channel, SAS chnl for short), a dispatcher in the SAS controller obtains the information such as the pending IO ID (identifier), the device ID, and the port ID by indexing the list. Then the dispatcher or a DMAC (Direct Memory Access Controller, direct memory access controller) on the idle SAS channel obtains, according to the pending IO ID (that is, a selected IO ID), an IO context (IO context), for example, obtains content such as an address, in storage space, of a frame corresponding to the IO and a length of the frame corresponding to the IO; and obtains, according to the device ID (that is, a selected device ID), information related to the device, for example, obtains an address of the target device in the SAS domain and an ID of the port performing frame interaction with the target device. The DMAC obtains frame data (a command frame or a data frame) in the storage space according to the obtained IO context, and completes data frame interaction with the target device according to the obtained information related to the target device.

The following describes the functions of the apparatuses and modules in FIG. 3.

In FIG. 3, the management and dispatching system based on the SAS includes a management and dispatching apparatus based on the SAS and a SAS domain (SAS domain) 200.

The SAS domain 200 includes multiple devices 220 and one or more expanders 210. The expander 210 is configured to connect more devices 220 in the SAS domain. The device 220 may be a disk sheet, such as a mechanical hard disk of the disk sheet or a solid-state disk; or the device 220 may be a SAS host (SAS host), such as a server. In a case in which a host performs networking, the device 220 is a disk sheet. In a case in which a disk sheet performs networking, the device 220 is a SAS host.

The management and dispatching apparatus based on the SAS includes a memory 100, a CPU 400, and a SAS controller 300.

The memory 100 is configured to store a related frame in an IO interaction process, including a data frame, a command frame, and a response frame. For example, the memory 100 stores a read command frame, a write command frame, a command frame for inquiring device-related content (for example, inquiring a host log text), a data frame written in a device in the SAS domain, and a response frame sent by the device (for example, a disk sheet) in the SAS domain after a command is executed.

In an example, the memory 100 is configured to store an entry (referring to Table 4 below) recording an IO context (IO Context) and store an entry (referring to Table 5 below) recording information about all devices (devices in the SAS domain) that are obtained through scanning in the SAS domain (SAS Domain). It should be noted that the entry used for recording the IO content and the entry used for recording content related to the devices that are obtained through scanning may be stored by a storage module in the SAS controller, or may be jointly stored by the memory 100 and the storage module in the SAS controller.

In an example, the memory 100 is a main memory or a memory. For example, the memory 100 is an off-chip DDR (Double Data Rate, double data rate synchronous dynamic random memory) or an on-chip RAM (random access memory, random access memory).

The CPU 400 is configured to store, in the memory 100, the related frame obtained from an upper-layer protocol (for example, application-layer software). For example, the application-layer software needs to deliver a file (for example, a film file) to a given device (for example, a given disk sheet) in the SAS domain, and then the CPU 400 first stores the file in the memory 100 in a manner of a data frame.

In an example, the CPU 400 is further configured to scan all devices in the SAS domain 200, so as to obtain content (referring to Table 5 below) related to all the devices in the SAS domain, and store, in the memory 100 or the storage module 313, the obtained content related to all the devices.

In an example, content obtained through scanning by the CPU 400 is stored in a form of a data structure (customized data structure), referring to Table 5 below. Further, the device-related content includes information such as whether a device is valid, a type of the device, an ID (identifier) of a port performing interaction with the device, and an ID (identifier) of the device, and for details, refer to Table 5 below. It should be noted that the content related to all the devices in the SAS domain is not limited thereto, that is, not limited to Table 5 below.

The following describes the SAS controller 300 in detail.

The SAS controller 300 includes a hardware accelerator 310, multiple SAS channels 320, and multiple ports 330, where the multiple ports are logic ports and have no physical entity structure.

The hardware accelerator 310 includes an LM (list management) module 311, a dispatcher (Dispatch) 312, a storage module 313, and a parsing module 314, where each SAS channel includes a corresponding DMAC (Direct Memory Access Controller, direct memory access controller) 321.

The storage module 313 is an optional module, that is, the hardware accelerator 310 may not include the storage module 313. The storage module 313 is configured to store an entry (referring to Table 4 below) recording an IO context and an entry (referring to Table 5 below) recording content related to all devices that are obtained through scanning in the SAS domain.

The following provides descriptions by using an example in which the foregoing entry recording the IO context and the entry recording the content related to all the devices that are obtained through scanning in the SAS domain are stored in the storage module 313.

The parsing module 314 is an optional module, and is configured to: receive a request delivered by the upper-layer protocol (for example, application layer software), that is, receive a data structure, from upper-layer software, used for recording data or command information, parse the request, store the IO context obtained through parsing in the storage module 313 in a form of a new data structure (referring to Table 5 below), and add information obtained through parsing such as an IO ID, a device ID, and an ID of a port interacting with a device to a list in the LM module 311. That is, ID information such as a pending IO ID, the device ID, and the ID of the port interacting with the device is obtained by parsing the data structure delivered by the upper-layer software.

In an example, the IO context stored in the storage module 313 includes information such as an IO ID corresponding to an IO, an address, in storage space (the memory 100, or the storage module 313), of a frame corresponding to the IO, and a length of a frame (a length of a data frame or a command frame). The information stored in the LM module 311 is only the ID information such as the IO ID, the device ID, and the ID of the port interacting with the device, and is stored in the LM module 311 in a manner of a list, in order to facilitate indexing.

The LM module 311 manages, in a manner of a list, pending IO information and device information that are obtained based on the upper-layer protocol request (that is, the data structure delivered by parsing the upper-layer software). In an example, the pending IO information is a pending IO ID, and the device information is a device ID. Further, the list further includes information about a port performing frame interaction with the device, and the information about the port is whether there is a pending device ID at the port.

In an example, the pending IO information, the device information, and the information about the port are stored in the list of the LM module 311 in a form of a data structure, specifically including a port node data structure, a device list node data structure, and an IO list node data structure.

In an example, the LM module 311 centrally manages a port node, a device list node, and an IO list node in a manner of a list (referring to FIG. 5 and related content descriptions below), including refreshing node content, performing link addition, performing link deletion, adjusting a node position, and the like. For example, after the LM module 311 receives a link addition request from the parsing module 314, the LM module 311 adds information, such as the pending IO ID, the device ID, and the ID of the port interacting with the device, that is obtained through parsing by the parsing module 314 to each node data structure in the list.

The following separately elaborates the foregoing port node data structure, the device list node data structure, and the IO node data structure.

Table 1 below shows whether there is a device, at a given port, performing information interaction with the port. If there is a device performing information interaction with the port, a device ID (identifier) of a first device (that is, a header device) that performs information interaction with the port and a device ID (identifier) of a last device (that is, a tail device) that performs information interaction with the port may be obtained. An ID of a first pending IO and an ID of a last pending IO on the device are obtained according to the ID of the header device in Table 1 by searching Table 2. An ID of a previous pending IO of a current pending IO and an ID of a next pending IO of the current pending IO in Table 3, and a device ID of a previous device of a current device and a device ID of a next device of the current device in Table 2 may further be used in link addition and link removing.

For the port node data structure, refer to Table 1 below:

TABLE 1

| port_have_pending | Dev_list_hder [y:0] | Dev_list_tail [y:0] |
|---|---|---|
| | Invalid when Port_have_pending is invalid | |

Port_have_pending is used to indicate whether there is a pending device (pending device) at a current port, and the pending device refers to a device having a pending IO on the device. The pending device also refers to a target device, that is, a device receiving data, and the data is data, obtained according to an ID of the pending IO, in a storage address corresponding to the IO. When there is a pending device, there is inevitably a pending IO on the device, that is, when there is a pending device, there is inevitably an IO sent to the pending device.

Dev_list_hder is used to indicate a header device ID (identifier) in a device list (referring to Table 2 below) at the current port, that is, a device ID of a first device at the current port.

Dev_list_tail is used to indicate a tail device ID (identifier) in the device list (referring to Table 2 below) at the current port, that is, a device ID of a last device at the current port.

In Table 1, a value y is related to a quantity, of devices in the SAS domain, that is supported by the SAS controller. When port_have_pending is invalid. That is, when there is no pending device at the current port, Dev_list_hder and Dev_list_tail are invalid. That is, the header device ID and the tail device ID that correspond to the port are invalid. That is, there is no target device.

For the device list node (DEV_list Node) data structure, refer to Table 2 below:

TABLE 2

| In_list | Pending_cmd | cmd_list_tail [x:0] | cmd_list_hder [x:0] | Prev_DEV_id [y:0] |
|---|---|---|---|---|
| Rsv | Pending_data | data_list_tail [x:0] | data_list_hder [x:0] | Next_DEV_id [y:0] |

In_list is used to indicate whether a device ID of a current device is in the DEV_List Node data structure, and when In_list is invalid, other information in the DEV_List Node is invalid.

In some cases, for example, when a peer device requests to perform information interaction with the SAS controller 300, that is, when the SAS controller 300 passively receives data, the header device ID and the tail device ID that are obtained through parsing by the parsing module 314 may have deviations sometimes. Therefore, it may be further determined, by using the field in_list in Table 2, whether the device ID is in the device list (DEV_list).

Pending_cmd is used to indicate whether there is a pending command (cmd) task on the current device, that is, used to indicate whether there is a pending IO on the current device, where the pending IO is a pending command (cmd) 10.

Cmd_list_tail[x:0] is used to indicate a tail pending IO ID of the pending cmd task on the current device.

Cmd_list_hder[x:0] is used to indicate a header pending IO ID of the pending cmd task on the current device.

Prev_DEV_ID[y:0] is used to indicate a device ID of a previous device of the current device.

Pending_data is used to indicate whether there is a pending data (data) task on the current device, that is, used to indicate whether there is a pending IO on the current device, where the pending IO is a pending data (data) 10.

Data_list_tail[x:0] is used to indicate a tail pending IO ID in a pending data (data) task list on the current device.

Data_list_hder[x:0] is used to indicate a header pending IO ID in the pending data (data) task list on the current device.

Next_DEV_ID[y:0] is used to indicate a device ID of a next device of the current device.

Rsv is a reservation domain.

A value x is related to a quantity of concurrent IOs that is supported by the SAS controller, and a value y is related to a quantity, of devices in the SAS domain, that is supported by the SAS controller.

For the IO list node (IO_list_Node) data structure, refer to Table 3 below:

TABLE 3

| In_data_list | In_cmd_list | Prev_IO_id [x:0] | Next_IO_id [x:0] |
|---|---|---|---|

In_data_list is used to indicate whether a current pending IO is a data task IO, that is, used to indicate whether the current pending IO is a pending data IO.

In_cmd_list is used to indicate whether the current pending IO is a command task IO, that is, used to indicate whether the current pending IO is a pending command IO.

Prev_IO_ID[x:0] is used to indicate an ID of a previous pending IO of the current pending IO.

Next_IO_ID[x:0] is used to indicate an ID of a next pending IO of the current pending IO. A value x is related to a quantity of concurrent IOs that is supported by the SAS controller.

It should be noted that the data structures in Table 1, Table 2, and Table 3 are only an example, and data structures of the embodiments of the present invention are not limited thereto.

According to this embodiment, a pending (pending) IO, that is, an IO that needs to be sent but has not been sent, is managed in a form of an ID in a manner of a list, in order to facilitate indexing. A port data structure, a device data structure, and an IO data structure are separately stored. Therefore, when an exception occurs, the SAS controller conveniently cancels all pending IOs at a device, or conveniently cancels all pending IOs at a port. In the device list node data structure, because a command and data are separated, the command and the data are indicated in a form of different field.

The following continues to describe how the dispatcher 312 in FIG. 3 obtains a pending IO ID and a device ID by indexing a list in the LM module 311, and how to dispatch the pending IO.

Figure 4:
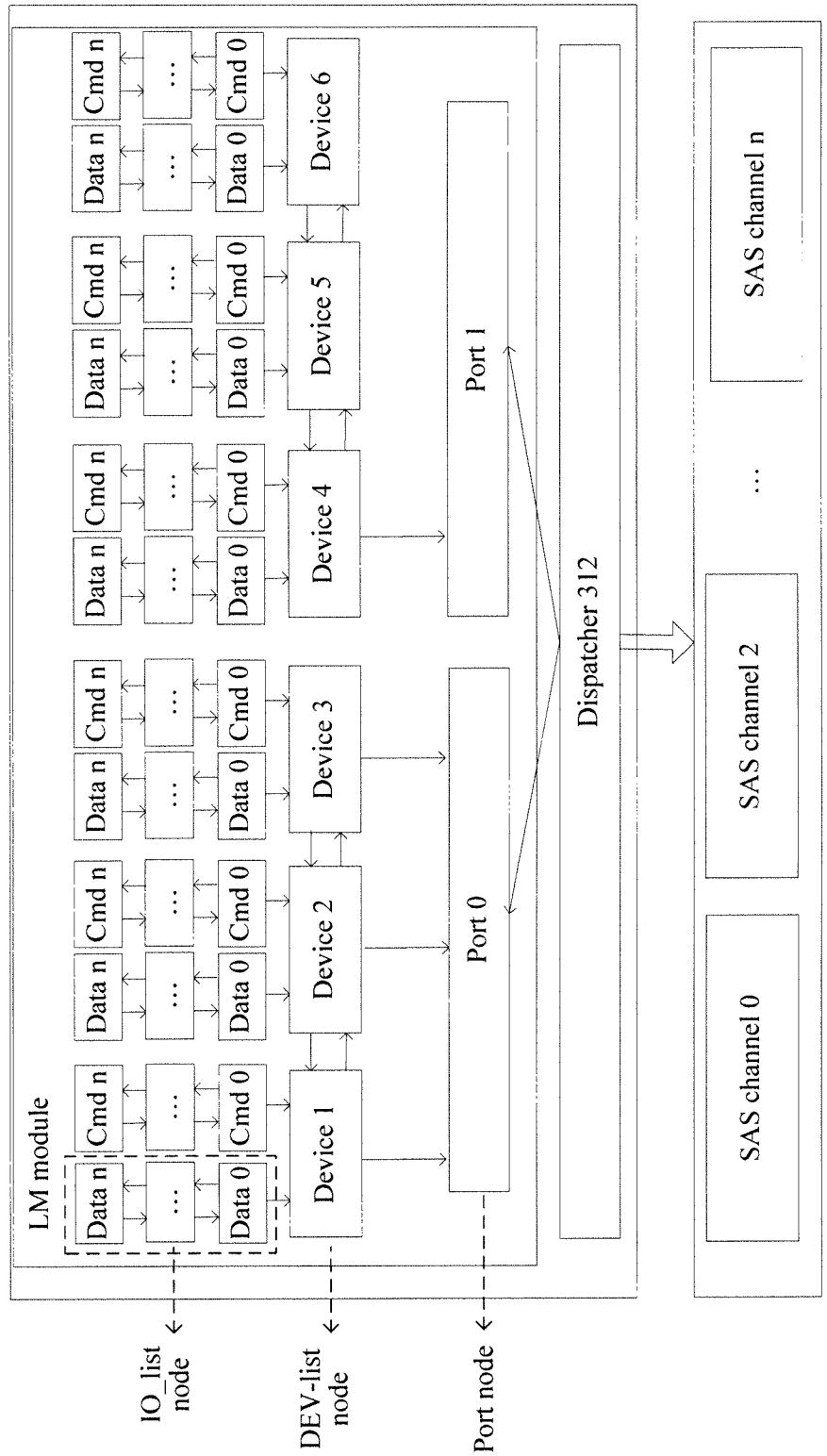
FIG. 4 is a schematic diagram of a dispatcher implementing dispatching according to an embodiment of the present invention.

FIG. 4 is a schematic diagram showing that a dispatcher implements dispatching according to an embodiment of the present invention.

In FIG. 4, after the dispatcher 312 detects that there is an idle SAS channel, the dispatcher 312 obtains, in a manner of indexing, information such as the pending IO ID, the device ID, and a port ID in a list of a LM module.

In an example, the dispatcher 312 obtains the pending IO ID by indexing the list in the LM module 311, obtains, according to the pending IO ID, a corresponding IO context by searching a table (referring to Table 4 below); and obtains the device ID by indexing the list in the LM module 311, and obtains, according to the device ID, corresponding device-related content by searching a table (referring to Table 5 below).

Specifically, Table 1, Table 2, and Table 3 store ID information, including a device ID and an IO ID. An ID of a device performing information interaction with a port can be obtained by using Table 1. According to the device ID in Table 1, for example, a device ID of a header device, a pending IO ID on the device is obtained by searching Table 2. An IO context corresponding to the pending IO ID may be obtained according to the pending IO ID by searching Table 4, including a storage address, in storage space, of the IO, a length of stored data, and the like, and information such as an address of a target device corresponding to the device ID may be obtained according to the device ID obtained in Table 2 by searching Table 5, so as to send the obtained data to the target device.

In another example, the dispatcher 312 obtains information such as the pending IO ID and the device ID by indexing the list in the LM module 311, and sends the information to an idle SAS channel. A DMAC on the SAS channel obtains a corresponding IO context according to the pending IO ID by searching a table (referring to Table 4 below), and obtains corresponding device-related content according to the device ID by searching a table (referring to Table 5 below).

Specifically, the dispatcher 312 checks a status of each SAS channel (a SAS channel 0, a SAS channel 1, ..., or a SAS channel n) in real time, that is, checks whether there is an idle SAS channel. If there is an idle SAS channel, the dispatcher checks whether there is a pending IO in the LM module. First, the dispatcher checks whether there is a pending device (the pending device refers to a target device, and also refers to a device on which there is a pending IO) at each port (port) (a port 0 or a port 1). If there is a pending device at the port 0, a device list at the port 0 is selected. A device 1 (that is, a list header device in the device list) maintained at the port 0 is checked by using the device list, and a list header IO of a pending IO link maintained on the device 1 is selected. It is checked whether the IO is a pending command (cmd) task or a pending data (data) task, that is, it is checked whether the IO is a pending command IO or a pending data IO. If there is a pending data (data) task, a corresponding pending data IO is obtained. If there is a pending command (cmd) task, a corresponding pending command IO is obtained. Then, pending data IO content is obtained by searching a pending IO context entry (stored in Table 5 below of the storage module 313). For example, information such as an address, in storage space, of a frame corresponding to the IO and a length of the frame (a data frame or a command frame) corresponding to the IO is obtained.

The following elaborates how the dispatcher in FIG. 4 implements dispatching in more details with reference to Table 1, Table 2, and Table 3. After the dispatcher detects that there is an idle SAS channel, the dispatcher checks each port node (a port 0 or a port 1) data structure (referring to Table 1) in the list stored in the LM module, and when a field port_have_pending in a given port (for example, the port 0) is valid, the dispatcher knows that there is a pending device at the port 0. The dispatcher then obtains an ID of a header pending device such as the device 1 at the port 0 and an ID of a tail pending device such as the device 3 at the port 0 by using the port node data structure (referring to Table 1). Then the dispatcher searches the device list node data structure (referring to Table 2) according to the obtained ID of the header pending device. If the field in_list in the device list node (DEV_list node) data structure (referring to Table 2) is valid, the ID of the device is in the DEV_list node. Then the dispatcher continues to check whether there is a pending command task (obtained by using the field pending_cmd) or a pending data task (obtained by using the field pending_data) in the DEV_list node data structure. If there are both a pending command task and a pending data task, a corresponding task is selected according to a command/data dispatching priority policy; or if there is only a command task or a data task, a corresponding task is directly selected. Once it is selected to send a command or data at this time, an ID (obtained by using the field cmd_list_hder) of the IO corresponding to a header node of a corresponding task list is directly obtained, and in this way, the pending IO ID is selected. The dispatcher extracts the pending IO ID from the LM module. The LM module updates the list, including updating the port node, the device list node, and the IO list node. The dispatcher searches, according to the pending IO ID obtained by indexing the list, the entry (referring to Table 4 below) recording the IO context, to obtains an IO context corresponding to the pending IO ID, including information such as an address, in the storage space, of a frame corresponding to the IO, a length of the frame corresponding to the IO, and an offset (offset). In addition, the dispatcher searches, according to the device ID obtained by indexing the list, the entry (referring to Table 5 below) recording context related to all devices that are obtained through scanning in the SAS domain, to obtain information such as an ID of a port interacting with the device and an address of the device in the SAS domain (for example, an SAS address of 64 bits).

The IO context in Table 4 below is obtained by parsing a data structure delivered by an upper-layer protocol, and device-related content in Table 5 below is obtained by using a CPU by scanning an entry 2 of information about all devices in the SAS domain. Table 4 is an entry (IOST) used to record multiple pieces of IO content, that is, an IO context data structure.

TABLE 4

| IO context entry | | Byte 3 (Byte 3) | Byte 2 (Byte 2) | Byte 1 (Byte 1) | Byte 0 (Byte 0) |
|---|---|---|---|---|---|
| IO id 0 context | DW 0 | IO basic information | | IO identifier (IO id) | Valid indication (valid) |
| IO id 1 context | DW 1 | Frame address of lower-order 32 bits (Frame addr_L) | | | |
| IO context | DW 2 | Frame address of lower-order 32 bits (Frame addr_H) | | | |
| . | DW 3 | Data offset (Data_offset) | | | |
| . | DW 4 | IO data length (IO_data_length) | | | |
| . | . | . | | | |
| . | DW Y | | | | |
| IO id m context | | | | | |

In Table 4, in an IOST data structure, each IO context (an IO ID 0 content, an IO ID 1 content, . . . , or an IO ID m content) corresponds to one piece of IO context information, including information such as information indicating whether a current IO is valid, an IO ID corresponding to the IO, an address, in storage space, of a frame corresponding to the IO, a length of the frame (data frame or command frame) corresponding to the IO, and a data offset.

It should be noted that if pending IOs are sequentially recorded in the IOST data structure of Table 4, an IO identifier (ID) is an index number of Table 4. Therefore, Table 4 may not include the IO ID. In this case, the dispatcher 312 may obtain the pending IO context by using the index number.

Table 5 is an entry used to record content related to all devices that are obtained through scanning in the SAS domain, that is, a data structure of the content related to all the devices.

TABLE 5

| Device information entry | | Byte 3 (Byte3) | Byte 2 (Byte2) | Byte 1 (Byte1) | | | Byte 0 (Byte0) |
|---|---|---|---|---|---|---|---|
| Device 0 context | DW 0 | Other device information | | Port id | Sending priority (TX_pri) | Device type (DEV type) | Valid indication (valid) |
| Device 1 context | DW 1 | Lower-order bit of an address of a device in a SAS domain (SAS Address_L) | | | | | |
| Device information | DW 2 | High-order bit of an address of a device in a SAS domain (SAS Address_H) | | | | | |
| . | . | . | | | | | |
| . | DW X | | | | | | |
| Device n context | | | | | | | |

In Table 5, in an ITCT data structure, content of each device (content of a device 0, content of a device 1, . . . , and content of a device n) records one piece of device information, including information such as information indicating whether a device is valid, a device type, a command and data dispatching priority on the device, an ID of a port performing frame interaction with the device, and an address of the device in the SAS domain.

It should be noted that the entry recording the content related to all the devices that are obtained through scanning in the SAS domain in Table 5 is obtained by the CPU by scanning the SAS domain after the SAS controller performs networking. Once the scanning is completed, the entry (Table 5) recording the content related to all the devices that are obtained through scanning in the SAS domain does not change, and rescanning is performed only after a SAS network changes, so as to obtain an entry of content related to all devices in a new SAS domain.

In addition, if the devices obtained through scanning by the CPU are sequentially recorded in the ITCT data structure in Table 5, the device ID is an index number of Table 5. Therefore, Table 5 may not include the device ID. In this case, the dispatcher 312 may obtain device-related content by using the index number.

Figure 5:
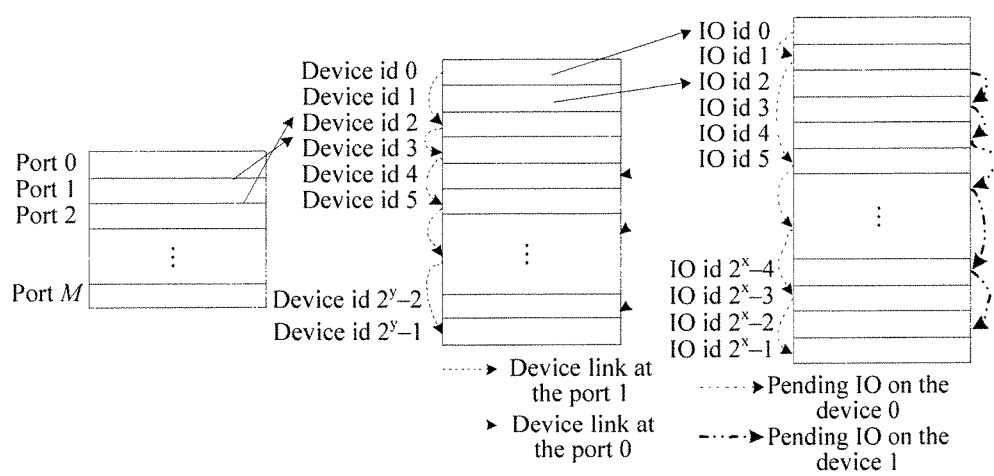
FIG. 5 is a schematic diagram showing that a LM module centrally manages a list according to an embodiment of the present invention.

It can be seen that the LM module 311 manages concurrency of multiple IOs in a manner of pending IOs by using a list, thereby implementing centralized management of multiple ports, multiple devices and concurrency of multiple IOs. In addition, a list in the LM module maintains an IO, device, and port ID (identifier), that is, index numbers. Subsequently, the dispatcher 312 obtains the IO ID, the device ID, and the port ID in the list in a manner of indexing. Then a DMAC on a SAS channel performs frame interaction with a target device in the SAS domain based on the pending IO ID and an ID of the target device. It can be seen that a quantity of concurrent IOs sent by each device in the SAS domain is controllable, so that ports and devices work by turns as much as possible, thereby preventing a phenomenon, in which some devices are at high load while some other devices suffer from "starvation", from occurring. Refer to FIG. 5.

FIG. 5 is a schematic diagram showing that a LM module centrally manages a list according to an embodiment of the present invention.

In FIG. 5, there are pending devices at a port 0 (port 0) and a port 1 (port 1). Ids of devices interacting with the port 0 include a device ID 1, a device ID 4, . . . , and a device ID $2^y-2$; and IDs of devices interacting with the port 1 include a device ID 0, a device ID 2, a device ID 3, a device ID 5, . . . , and a device ID $2^y-1$. For the device ID 0, IDs of pending IOs under the device ID 0 include an IO ID 0, an IO ID 1, an IO ID 5, . . . , an IO ID $2^x-3$, and an IO ID $2^x-1$. For the device ID 1, IDs of pending IOs under the device ID 1 include an IO ID 2, an IO ID 3, an IO ID 4, . . . , an IO ID $2^x-4$, and an IO ID $2^x-2$. In FIG. 5, a depth of a device list is a quantity of devices that is supported by a SAS controller, and a depth of an IO list is a maximum quantity of concurrent IOs that is supported by the SAS controller. It can be seen that the LM module stores a pending IO by using a list, and correlates a port, a pending device, and the pending IO by using the list, thereby facilitating management, so that the SAS controller can support a larger quantity of concurrent IOs and can be connected to more devices to a greater extent. The dispatcher obtains IDs of pending IOs by indexing the list, thereby implementing centralized dispatching of the pending IOs.

The following continues to describe the functions of the modules on the SAS channel in FIG. 3.

In FIG. 3, the SAS controller 300 includes multiple SAS channels. A SAS channel 320 includes a DMAC 321.

The DMAC 321 is configured to move a data frame or a command frame.

Specifically, after finding that there is an idle SAS channel, the dispatcher sends an IO context and device-related content to the idle SAS channel (or the dispatcher may send information such as an ID of a pending IO and a device ID, and then the DMAC on the SAS channel obtains the IO context and the device-related content by searching a table). The DMAC 321 on the SAS channel receives a pending IO context from the dispatcher 312, for example, the pending IO context includes the ID of the IO, an address, in storage space, of a frame corresponding to the IO, a length of the frame (a data frame or a command frame), and the like; and receives content related to a target device, including the device ID, a device type, an ID of a port interacting with the device, an address of the device in the SAS domain, and the like. The DMAC 321 obtains corresponding frame data, including the data frame or the command frame, from the storage 100 according to the received pending IO context. The DMAC 312 starts moving the data frame or the command frame according to the received content related to the target device, and completes frame interaction with the target device by using bottom-layer links such as a transport layer, an interface layer, a data link layer, and a physical layer.

In conclusion, according to this embodiment, a pending (pending) IO, that is, an IO that needs to be sent but has not been sent, and a target device are temporarily stored and managed in a form of IDs in a manner of a list. After perceiving that there is an idle channel, the dispatcher 312 obtains an ID of a pending IO and an ID of a target device by indexing the list, and sends, to an idle SAS channel, the ID of the pending IO and the ID of the target device, or an IO context and device-related content that are obtained according to the ID of the pending IO and the ID of the target device. A DMAC on the SAS channel obtains a command frame or a data frame from the memory according to the IO context, and implements frame data interaction with the target device according to the device-related content. Therefore, this embodiment of the present invention prevents a phenomenon, in which some devices are at high load while some other devices suffer from "starvation", from occurring.

Figure 6:
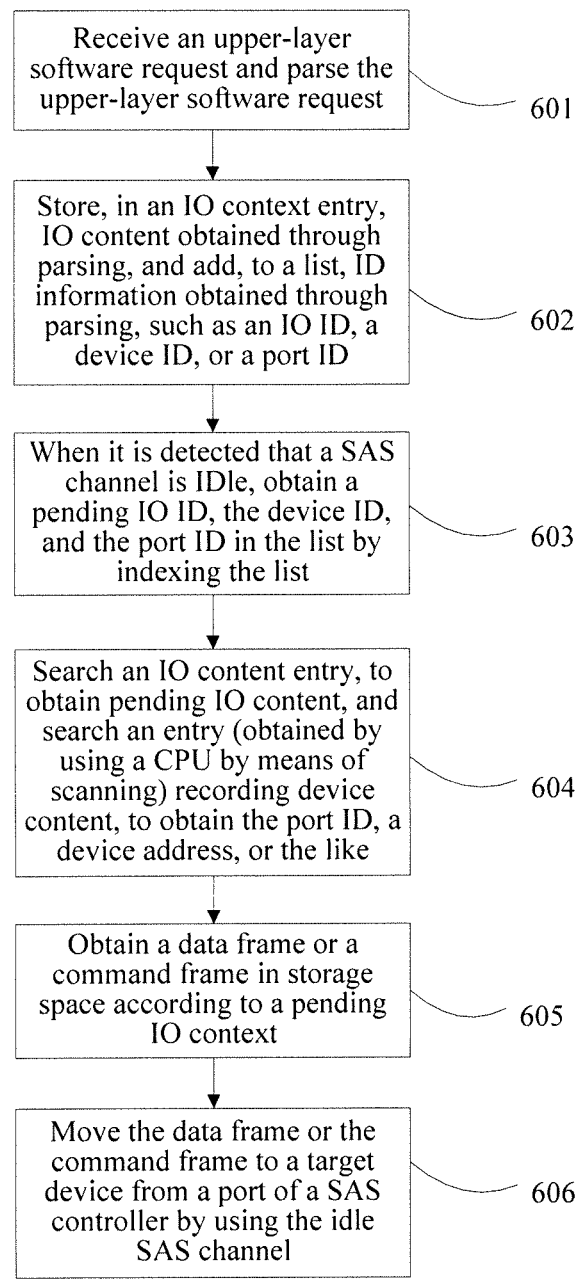
FIG. 6 is a flowchart of a management and dispatching method based on a SAS according to an embodiment of the present invention.

FIG. 6 is a flowchart of a management and dispatching method based on a SAS according to an embodiment of the present invention. A SAS controller communicates with a device in a SAS domain based on an upper-layer protocol request.

Step 601: The SAS controller receives a request delivered by an upper-layer protocol (for example, application layer software), that is, receives a data structure used to record data or command information from upper-layer software and parses the request, so as to obtain an IO context such as an IO ID (identifier), whether an IO is valid, an address, in storage space, of a frame corresponding to an IO, or a length of a frame corresponding to an IO; and to obtain ID information such as the IO ID, a device ID, and an ID of a port interacting with the device.

Step 602: The SAS controller stores the IO context in an entry (referring to Table 4) of the IO context in a form of a data structure. In addition, the SAS controller adds the ID information such as the IO ID, the device ID, and the ID of the port interacting with the device to a list in the SAS controller, that is, the SAS controller executes a link-addition operation. The list includes a port node data structure (referring to Table 1), a device list node data structure (referring to Table 2), and an IO node data structure (referring to Table 3).

Step 603: The SAS controller checks a status of a SAS channel, and when the SAS channel is idle, the SAS controller obtains the information such as a pending IO ID, the device ID, and the port ID in the list by indexing the list, that is, executes a link obtaining operation.

Step 604: The SAS controller obtains, according to the pending IO ID by searching a table (for example, Table 4), the IO context, including information such as an address, in storage space, of a frame corresponding to a pending IO, a length of a frame corresponding to an IO, or an offset (offset). The SAS controller obtains, according to the device ID by searching a table (for example, Table 5), device-related content, including information such as an ID of a port interacting with the device, or an address of the device in the SAS domain.

In an example, when the SAS controller detects that there is an idle SAS channel, the SAS controller sends a pending IO ID and a device ID to a DMAC on the SAS channel. The DMAC obtains a corresponding IO context by searching the entry (referring to Table 4) recording the IO context. The DMAC obtains, according to the device ID, content related to a target device by searching the entry (referring to Table 5) recording content related to all devices that are obtained through scanning in the SAS domain.

In another example, the SAS controller obtains a corresponding IO context by searching the entry recording the IO context (referring to Table 4), and obtains, according to the device ID, content related to a target device by searching the entry (referring to Table 5) recording content related to all devices that are obtained through scanning in the SAS domain. When the SAS controller detects that there is an idle SAS channel, the SAS controller sends the IO context and the device-related content to the SAS channel.

Step 605: The SAS controller obtains a corresponding data frame or command frame in storage space according to the IO context, including information such as the pending IO ID, an address, in the memory, of the frame corresponding to the IO, and the length of the frame. In addition, the data frame or the command frame in the storage space is written in the storage space by the upper-layer software.

Step 606: The SAS controller moves the data frame or the command frame to the target device from the port of the SAS controller by using the idle SAS channel detected by the SAS controller. An ID of the port is the ID, obtained in step 605, of the port interacting with the device, and an address of the target device is the address, obtained in step 605, of the device in the SAS domain.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A management and dispatching apparatus based on a serial attached small computer system interface, wherein the apparatus communicates with a device in a corresponding serial attached small computer system interface domain based on an upper-layer protocol request, and the apparatus comprises:

a list management module, configured to manage, in a list, pending input and output information and device information that are obtained based on the upper-layer protocol request, wherein the list further comprises information about a port performing frame interaction with the device, and the information about the port includes whether there is pending device information at the port;

a dispatcher, configured to: after there is an idle serial attached small computer system channel, obtain the pending input and output information and the device information in the list by indexing the list; and a direct memory access controller on the serial attached small computer system channel, configured to perform frame interaction with the corresponding device in the serial attached small computer system domain based on the pending input and output information and the device information.

2. The apparatus according to claim 1, wherein the pending input and output information is a pending input and output identifier, and the device information is a device identifier.

3. The apparatus according to claim 1, wherein the information about the port is stored in the list in a form of a data structure, and the data structure comprises one or more of the following fields: a field used to indicate whether there is a pending device at a current port, a field used to indicate a list header node identifier of a pending device at a current port, or a field used to indicate a list tail node identifier of a pending device at a current port.

4. The apparatus according to claim 1, wherein the apparatus obtains the pending input and output information and the device information by parsing the upper-layer protocol request, and stores the obtained pending input and output information in the list.

5. The apparatus according to claim 1, wherein the pending input and output information is stored in the list in a form of a data structure, and the data structure comprises one or more of the following fields: a field used to indicate a previous input and output identifier of a current input and output identifier, or a field used to indicate a next input and output identifier of a current input and output identifier.

6. The apparatus according to claim 1, wherein the apparatus obtains a corresponding input and output context comprising the pending input and output information by parsing the upper-layer protocol request.

7. The apparatus according to claim 6, wherein the input and output context is stored in a first entry in a form of a data structure, and the data structure comprises one or more of the following fields: a field indicating whether an input and output identifier is valid, an input and output identifier, an address, in storage space, of a frame corresponding to an input and output identifier, or a length of a frame corresponding to an input and output identifier.

8. The apparatus according to claim 7, wherein the dispatcher or the direct memory access controller obtains, according to the pending input and output information, the corresponding input and output context by indexing the first entry, so that the direct memory access controller obtains, according to the input and output context, frame data corresponding to the input and output identifier, so as to implement interaction of the frame data.

9. The apparatus according to claim 1, wherein the device information is stored in the list in a form of a data structure, and the data structure comprises one or more of the following fields: a field used to indicate whether there is a pending command input and output identifier on a current device, a field used to indicate an input and output identifier corresponding to a pending command input and output list tail node on a current device, a field used to indicate an input and output identifier corresponding to a pending command input and output list header node on a current device, a field used to indicate whether there is a pending data input and output identifier on a current device, a field used to indicate an input and output identifier corresponding to a pending data input and output list tail node on a current device, a field used to indicate an input and output identifier corresponding to a pending data input and output list header node on a current device, a field used to indicate a device identifier of a previous node of a current node, or a field used to indicate a device identifier of a next node of a current node.

10. The apparatus according to claim 1, wherein the apparatus further comprises a CPU, wherein the CPU is configured to scan a device in the serial attached small computer system interface domain, so as to obtain content related to all devices in the serial attached small computer system interface domain and comprising the device information.

11. The apparatus according to claim 10, wherein the device-related content is stored in a second entry in a form of a data structure, and the data structure comprises one or more of the following fields: a device-type field, a command IO and data IO dispatching priority field on the device, an identifier field of the port interacting with the device, or an address of the device in the SAS domain.

12. The apparatus according to claim 11, wherein the device information is the device identifier, and the dispatcher or the direct memory access controller obtains device-related content corresponding to the device identifier by indexing the second entry according to the device identifier, so that the direct memory access controller implements frame interaction with the device according to the device-related content.

13. A management and dispatching apparatus based on a serial attached small computer system interface, wherein the apparatus communicates with a device in a corresponding serial attached small computer system interface domain based on an upper-layer protocol request, and the apparatus comprising:
   a list management module, configured to manage, in a list, pending input and output information and device information that are obtained based on the upper-layer protocol request, wherein the list further comprises information about a port performing frame interaction with the device, and the information about the port is whether there is pending device information at the port;
   a dispatcher, configured to: after there is an idle serial attached small computer system channel, obtain the pending input and output information and the device information in the list by indexing the list; and
   a direct memory access controller on the serial attached small computer system channel, configured to perform frame interaction with the corresponding device in the serial attached small computer system domain based on the pending input and output information and the device information,
   wherein the indexing is: when the dispatcher detects that the information about the port is that there is pending device information at the port, obtaining, by the dispatcher, the device information at the port, and obtaining pending input and output information according to the obtained device information.

14. A method of management and dispatching based on a serial attached small computer system interface, wherein a controller of the serial attached small computer system interface communicates with a device in a corresponding serial attached small computer system interface domain based on an upper-layer protocol request, and the method comprises:
   checking, by the serial attached small computer system interface controller, a status of a serial attached small computer system interface channel, and when the serial attached small computer system interface channel is idle, obtaining pending input and output information and device information by indexing a list, wherein the pending input and output information and the device information are obtained by parsing the upper-layer protocol request and are managed in a list, wherein the list further comprises information about a port performing frame interaction with the device, and the information about the port includes whether there is pending device information at the port; and
   performing, by the serial attached small computer system interface controller, frame interaction with the corresponding device in the serial attached small computer system domain based on the pending input and output information and the device information.

15. The method according to claim 14, wherein the pending input and output information is a pending input and output identifier, and the device information is a device identifier.

16. The method according to claim 14, wherein the information about the port is stored in the list in a form of a data structure, and the data structure comprises one or more of the following fields: a field used to indicate whether there is a pending device at a current port, a field used to indicate a list header node identifier of a pending device at a current port, or a field used to indicate a list tail node identifier of a pending device at a current port.

17. The method according to claim 14, wherein before the checking, the method comprises: parsing the upper-layer protocol request, to obtain the pending input and output information and the device information, and storing the obtained pending input and output information and device information in the list.

18. The method according to claim 14, wherein the pending input and output information is stored in the list in a form of a data structure, and the data structure comprises one or more of the following fields: a field used to indicate a previous input and output identifier of a current input and output identifier, or a field used to indicate a next input and output identifier of a current input and output identifier.

19. The method according to claim 14, wherein before the checking, the method comprises: parsing the upper-layer protocol request, to obtain a corresponding input and output context.

20. The method according to claim 19, wherein the input and output context is stored in a first entry in a form of a data structure, and the data structure comprises one or more of the following fields: a field indicating whether an input and output identifier is valid, an input and output identifier, an address, in storage space, of a frame corresponding to an input and output identifier, or a length of a frame corresponding to an input and output identifier.

21. The method according to claim 20, wherein the performing comprises: obtaining, by the serial attached small computer system interface controller or a direct memory access controller on the serial attached small computer system interface channel according to the pending input and output information, the corresponding input and output context by indexing the first entry, so that the direct memory access controller obtains, according to the input and output context, frame data corresponding to the input and output identifier, so as to implement interaction of the frame data.

22. The method according to claim 14, wherein the device information is stored in the list in a form of a data structure, and the data structure comprises one or more of the following fields: a field used to indicate whether there is a pending command input and output identifier on a current device, a field used to indicate an input and output identifier corresponding to a pending command input and output list tail node on a current device, a field used to indicate an input and output identifier corresponding to a pending command input and output list header node on a current device, a field used to indicate whether there is a pending data input and output identifier on a current device, a field used to indicate an input and output identifier corresponding to a pending data input and output list tail node on a current device, a field used to indicate an input and output identifier corresponding to a pending data input and output list header node on a current device, a field used to indicate a device identifier of a previous node of a current node, or a field used to indicate a device identifier of a next node of a current node.

23. The method according to claim 14, wherein before the checking, the method comprises: scanning, by a CPU, a device in the serial attached small computer system interface domain, so as to obtain content related to all devices in the serial attached small computer system interface domain and comprising the device information.

24. The method according to claim 23, wherein the device-related content is stored in a second entry in a form of a data structure, and the data structure comprises one or more of the following fields: a device-type field, a command IO and data IO dispatching priority field on the device, an identifier field of the port interacting with the device, or an address of the device in the SAS domain.

25. The method according to claim 24, wherein the device information is the device identifier, and the serial attached small computer system interface controller or the direct memory access controller on the serial attached small computer system interface channel obtains, according to the device identifier, device-related content corresponding to the device identifier by indexing the second entry, so that the direct memory access controller implements frame interaction with the device according to the device-related content.

26. A method of management and dispatching based on a serial attached small computer system interface, wherein a controller of the serial attached small computer system interface communicates with a device in a corresponding serial attached small computer system interface domain based on an upper-layer protocol request, and the method comprising:
  checking, by the serial attached small computer system interface controller, a status of a serial attached small computer system interface channel, and when the serial attached small computer system interface channel is idle, obtaining pending input and output information and device information by indexing a list, wherein the pending input and output information and the device information are obtained by parsing the upper-layer protocol request and are managed in a list, wherein the list further comprises information about a port performing frame interaction with the device, and the information about the port is whether there is pending device information at the port; and
  performing, by the serial attached small computer system interface controller, frame interaction with the corresponding device in the serial attached small computer system domain based on the pending input and output information and the device information, wherein the checking comprises:
  when the dispatcher detects that the information about the port is that there is pending device information at the port, obtaining, by the dispatcher, the device information at the port, and obtaining pending input and output information according to the obtained device information.

* * * * *